United States Patent [19]

Herrington

[11] Patent Number: 4,519,146

[45] Date of Patent: May 28, 1985

[54] AIR RING PLENUM WITH MOLDED HOUSING

[75] Inventor: F. John Herrington, Holcomb, N.Y.

[73] Assignee: Mobil Oil Corporation, New York, N.Y.

[21] Appl. No.: 507,368

[22] Filed: Jun. 24, 1983

[51] Int. Cl.³ .............................................. F26B 13/02
[52] U.S. Cl. ......................................... 34/104; 34/20; 34/107; 34/105; 264/569
[58] Field of Search ............... 425/72, 326.1; 264/569; 34/20, 104, 105, 107, 106

[56] References Cited

U.S. PATENT DOCUMENTS 2,770,009  11/1956  Rogal et al. ........................... 425/72

Primary Examiner—Larry I. Schwartz
Attorney, Agent, or Firm—Alexander J. McKillop; Michael G. Gilman; Charles J. Speciale

[57] ABSTRACT

Disclosed is an air plenum for surrounding and cooling a tubular extruded film. The plenum has an annular air flow chamber defined in part by an apertured annular distribution plate to which is mounted an annular channel-like one-piece molded housing forming a main flow chamber and having a cross-sectional area which progressively decreases from an air inlet in said housing to a point farthest removed therefrom. The annular air flow chamber receives air from the main air flow chamber through the apertures of the distribution plate and redirects it to an annular outlet nozzle.

16 Claims, 3 Drawing Figures

AIR RING PLENUM WITH MOLDED HOUSING

BACKGROUND OF THE INVENTION

1. Field of the Invention

The present invention relates to an air ring plenum which surrounds a tubular film as it is extruded from a tubular die, the plenum directing air towards the film to cool the same prior to its blown expansion.

2. Discussion of the Prior Art

An annular air plenum typically used in the above-described environment is shown in FIG. 1. It is formed of ⅛" aluminum sheet which is bent and welded into a desired annular configuration. At least two air inlets 11, 13 are provided and the inner periphery 15 of the plenum has an annular outlet nozzle for directing an air flow towards the outer surface of an extruded tubular film which passes through the central opening 16. Air from the inlets 11 and 13 is directed counterclockwise in an outer annular chamber 17, which has a linearly decreasing cross-sectional shape, from inlets 11, 13 to points farthest removed therefrom. Air within outer chamber 17 passes radially through an annular screen 19, having perforations therein, into an inner annular chamber 21, which in turn guides the air radially to the outlet nozzle at the inner periphery 15 of the plenum.

Although, when precisely constructed, this air plenum provides good uniformity in air distribution about the outlet nozzle, it is difficult in practice to achieve a precise construction. This is because it is difficult to fabricate the aluminum with precision, particularly since it warps when welded. In addition, the use of a plurality of air inlets 11, 13, which serve the useful purpose of reducing variations in air flow from its entry into the plenum to various positions therearound, requires that all feed hoses supplying air to the inlets 11, 13 have the same air flow, which in practice is difficult to achieve, as the hoses typically have different lengths. Moreover, the perforated screen 19, which redirects the air flow radially inward, should have a relatively large length-to-diameter ratio for the holes therein to ensure proper radial orientation of the air flow, but the perforated screen, which consists of punched holes in an aluminum plate, typically has a length-to-diameter ratio of no greater than 1:1.

Furthermore, in order to ensure uniform air distribution around the plenum, it is necessary to have a linearly decreasing cross-sectional area. This is accomplished by fabricating an outer wall 23 of the plenum in a spiral pattern, which is a mathematically generated curve. For ease of construction this is sometimes approximated by using a circular shape offset from center, which introduces some inaccuracy in a desired air flow pattern.

Because of the difficulty of constructing the FIG. 1 plenum with precision, its construction cost is high.

SUMMARY OF THE INVENTION

The present invention is designed to overcome the problems noted above with prior art plenums of the type shown in FIG. 1, and has as one objective the provision of an annular air plenum which can be more easily and precisely constructed at lower cost to produce a precise and uniform air flow pattern at an outlet nozzle.

This objective is achieved by an air plenum of the invention which includes a main air flow chamber formed as an annular channel which is molded of a moldable material, e.g., fiberglass. The molded air flow chamber is connected to an annular distribution plate which closes the channel and which also contains a plurality of air flow holes spaced along the annular extent of the plate. The plate defines one wall of an air distribution chamber, which supplies cooling air received through the holes from the main air flow chamber to an annular outlet nozzle which can be placed to surround an extruded tubular film. The channel-shaped molded air flow chamber and air distribution chamber are easily and inexpensively produced and assembled from relatively inexpensive materials and with great precision to provide the plenum with a precise and uniform distributed air flow through the outlet nozzle.

These and other structural features, characteristics and advantages of the invention will be more clearly seen from the following detailed description of the invention, which is provided in connection with the accompanying drawings.

DETAILED DESCRIPTION OF THE INVENTION

Figure 2:
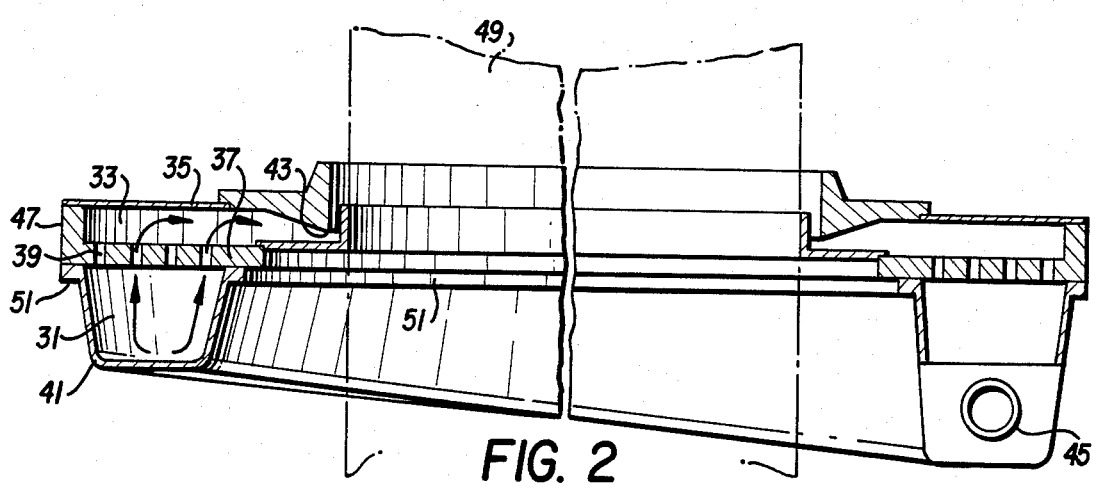
FIG. 2 is a cross-sectional view of an embodiment of the air plenum of the invention; and, FIG. 3 is a perspective view of a molded housing employed in the FIG. 2 embodiment.
Figure 3:
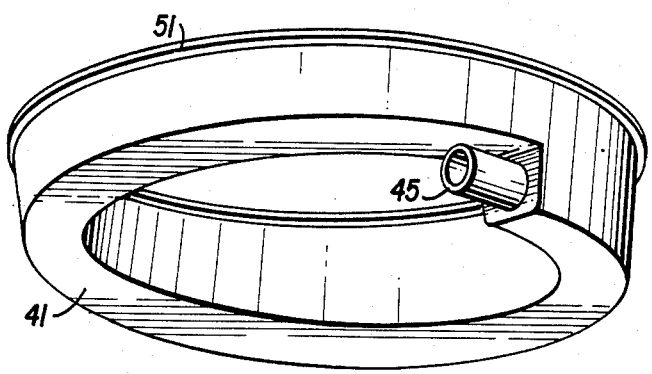

FIGS. 2 and 3 depict an air plenum of the invention. It includes an annular main air flow chamber 31 which has an air inlet 45 and an annular air distribution chamber 33 which receives cooling air from chamber 31. The main air flow chamber 31 is formed by a solid one-piece channel-like annular housing 41, preferably molded from fiberglass, and is closed by an annular distribution plate 37 which is coaxial to and connected above and with the annular housing 41 along its annular extent. The distribution plate 37 also forms one wall defining the annular air distribution chamber 33. The additional sidewalls of chamber 33 are formed by wall portion 47, upstanding from distribution plate 37, and an annular cover plate 35 connected to upstanding wall portion 47. Air enters the air distribution chamber 33 from the main air chamber 31 below it by way of holes 39, which are provided along the annular extent of plate 37 and extend axially of the plenum. The air in distribution chamber 33, in turn, is redirected radially toward an annular outlet nozzle 43 connected to the annular air outlet of distribution chamber 33. Outlet nozzle 43 directs outlet air towards an extruded tubular film 49, which passes through the bore defined by the inner periphery of the air plenum. Although outlet nozzle 43 is shown as producing an air flow in the same direction as the extrusion direction of film 49, it can also be configured to provide a radially directed air flow, or a combination of the two.

Air enters the main air flow chamber 31 through an inlet orifice 45 which, as illustrated, has its axis directed tangentially to housing 41 so that an air flow introduced at orifice 45 passes around the interior of chamber 31 with relatively little impediment. In order to balance the air flow from outlet nozzle 43 throughout its annular extent, housing 41 has a cross-sectional area which linearly decreases from the location of inlet orifice 45 along its annular extent, as shown in FIGS. 2 and 3. As a consequence, the quantity of air flow reduces linearly with angular displacement about the plenum from inlet orifice 45. Because the cross-sectional area of the main air flow chamber 31 is reduced, the tangential velocity of the air stays constant so that each hole 39 in distribution plate 37 is subjected to the same air velocity passing by it and all holes transmit the same amount of air into distribution chamber 33. This in turn produces a uniform air flow distribution radially through chamber 33 and throughout the annular extent of nozzle 43.

The housing 41 is fastened to distribution plate 37 along a pair of lips 51 at housing 41 with screws or other fasteners and a sealing gasket of, for example, room temperature vulcanized silicone rubber, is provided between lips 51 of housing 41 and the distribution plate 37.

Figure 1:
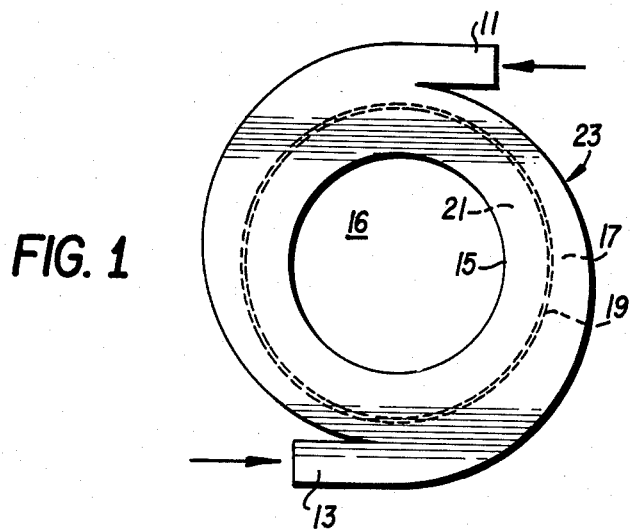
FIG. 1 is a top view of prior art air plenum which is useful in explaining the background of the invention.

The air plenum of the invention is easily and inexpensively manufactured when compounded with the plenum construction shown in FIG. 1. Since housing 41 is molded of, for example, fiberglass, it can be easily manufactured by spraying fiberglass over a machined wood form. Moreover, because the form can be easily and precisely machined, the molded housing in turn can be molded to a high degree of precision.

Likewise, the distribution plate 37 and associated cover 35 are easily and precisely manufactured. In the case of plate 37, it is easily machined with great precision using conventional machining techniques. Cover 37 can be easily and inexpensively produced with precision from a plate-like material. Likewise, the structure forming outlet nozzle 43 can also be easily machined.

Housing 41 has been described thus far as being molded of fiberglass, but it can be molded of other readily available materials such as plastics. Plate 37 and cover 35 can both be conveniently constructed of aluminum or other machinable materials. If desired, plate 37 and cover 35 could also be molded from other materials such as plastics.

In addition to having a lowered manufacturing cost and producing a more precise air flow, the air plenum of the invention has the additional advantages of being manufactured to high tolerances. Furthermore, it has but a single air inlet, making for a more compact and "neater" installation. The plenum of the invention also has a smaller overall outside diameter, as the cross-section of the housing 41 and main air flow chamber 31 decreases by a decrease in housing height rather than width. The plenum of the invention also has less pressure drop than the FIG. 1 plenum, as the air travels a shorter distance because of the reduced plenum diameter. In addition, distribution plate 37 can be made of any desired thickness, to improve the length-to-diameter ratio of holes 39, thus promoting a more reliable redistribution of the air entering chamber 33 through holes 39. Typically, a length-to-diameter ratio of at least 3:1 is achievable. Finally, the holes 39 can be more precisely and uniformly machined in size, direction and spacing.

Although one embodiment of the air plenum of the invention has been described and illustrated, it should be apparent that many modifications can be made thereto without departing from the spirit and scope of the invention. Accordingly, the invention is not limited by the foregoing description, but only by the claims appended hereto.

I claim:

1. An air plenum for cooling an extruded tubular film comprising:
    an annular chamber for surrounding a travel path of an extruded tubular film and having an annular outlet nozzle adjacent to the travel path for directing air towards a tubular film extruded along said travel path, said chamber including an annular air distribution plate forming a wall of said chamber and having a plurality of apertures spaced along its extent for receiving cooling air; and,
    an annular one-piece molded channel-like housing connected to said distribution plate and defining an annular air flow path for feeding cooling inlet air into said apertures, said housing having a height and width defining a cross-sectional area and at least one air inlet for directing air tangentially into said housing; said cross-sectional area progressively decreasing from each said inlet along at least a portion of the annular extent thereof by decreasing the height of said housing progressively along its annular extent.

2. An air plenum as in claim 1, wherein said housing is formed of a molded fiberglass.

3. An air plenum as in claim 1, wherein said housing is formed of a molded plastics.

4. An air plenum as in claim 1, wherein said apertures are formed as holes machined in said distribution plate, said holes having a length through said plate and a length-to-diameter ratio of greater than 1:1.

5. An air plenum as in claim 4, wherein the length-to-diameter ratio of said holes is at least 3:1.

6. An air plenum as in claim 1, wherein a single air inlet is provided and said housing progressively decreases in cross-sectional area from said inlet around the extent of said annular housing.

7. An air plenum as in claim 6, wherein said cross-sectional area decreases by a decreasing height of said housing.

8. An air plenum as in claim 1, wherein said housing has a height and a width defining said cross-sectional area and said cross-sectional area decreases by a decreasing height of said housing, said housing having a maximum height at the location of said air inlet and progressively decreasing in height along its annular extent.

9. An air plenum for cooling an extruded tubular film comprising:
    an annular chamber for surrounding a travel path of an extruded tubular film and having an annular outlet nozzle adjacent to the travel path for directing air towards a tubular film extruded along said travel path, said chamber including an annular air distribution plate forming a wall of said chamber and having a plurality of apertures therethrough which extend axially of said plenum and are spaced along its extent for receiving cooling air; and,
    an annular one-piece molded channel-like housing connected to said distribution plate upstream thereof and defining an annular air flow path for feeding cooling inlet air into said apertures, said housing having at least one air inlet for directing air tangentially into said housing and a cross-sectional area which progressively decreases from each said inlet along at least a portion of the annular extent thereof.

10. An air plenum as in claim 9, wherein said housing is formed of a molded fiberglass.

11. An air plenum as in claim 9, wherein said housing is formed of a molded plastics.

12. An air plenum as in claim 9, wherein said apertures are formed as holes machined in said distribution plate, said holes having a length through said plate and a length-to-diameter ratio of greater than 1:1.

13. An air plenum as in claim 12, wherein the length-to-diameter ratio of said holes is at least 3:1.

14. An air plenum as in claim 9, wherein a single air inlet is provided and said housing progressively decreases in cross-sectional area from said inlet around the extent of said annular housing.

15. An air plenum as in claim 14, wherein said cross-sectional area decreases by a decreasing height of said housing.

16. An air plenum as in claim 9, wherein said housing has a height and a width defining said cross-sectional area and said cross-sectional area decreases by a decreasing height of said housing, said housing having a maximum height at the location of said air inlet and progressively decreasing in height along its annular extent.

* * * * *